(12) United States Patent
Legler

(10) Patent No.: US 12,235,878 B2
(45) Date of Patent: Feb. 25, 2025

(54) ADJUSTABLE INVERTED INDEXES

(71) Applicant: SAP SE, Walldorf (DE)

(72) Inventor: Thomas Legler, Walldorf (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 18/212,327

(22) Filed: Jun. 21, 2023

(65) Prior Publication Data

US 2024/0427806 A1    Dec. 26, 2024

(51) Int. Cl.
  *G06F 16/31*   (2019.01)
  *G06F 16/33*   (2019.01)
  *G06F 16/334*  (2025.01)
  *G06F 16/338*  (2019.01)

(52) U.S. Cl.
  CPC .......... *G06F 16/319* (2019.01); *G06F 16/334* (2019.01); *G06F 16/338* (2019.01)

(58) Field of Classification Search
  CPC .................... G06F 16/319; G06F 16/2228
  See application file for complete search history.

(56) References Cited

U.S. PATENT DOCUMENTS

| | | | | |
|---|---|---|---|---|
| 7,149,748 B1* | 12/2006 | Stephan | ................ | G06F 16/319 707/999.102 |
| 10,810,236 B1* | 10/2020 | Zhao | ...................... | G06F 16/334 |
| 10,885,074 B2 | 1/2021 | Hua et al. | | |
| 2005/0055364 A1* | 3/2005 | Frieder | ................ | G06F 16/319 707/999.102 |
| 2006/0074962 A1* | 4/2006 | Fontoura | ............... | G06F 16/951 707/999.102 |
| 2008/0059420 A1* | 3/2008 | Hsu | .......................... | G06F 21/64 |
| 2011/0040761 A1 | 2/2011 | Dalton et al. | | |
| 2011/0040762 A1* | 2/2011 | Flatland | ................ | G06F 16/319 707/E17.089 |
| 2012/0130996 A1* | 5/2012 | Risvik | ............... | G06F 16/24578 707/723 |
| 2016/0147808 A1* | 5/2016 | Schreter | ................ | G06F 16/319 707/696 |
| 2016/0224660 A1* | 8/2016 | Munk | .................... | G06F 16/316 |
| 2018/0293327 A1* | 10/2018 | Miller | ..................... | G06F 16/26 |
| 2020/0050699 A1* | 2/2020 | Hua | ..................... | G06F 16/9017 |
| 2024/0045846 A1* | 2/2024 | Neubeck | ............... | G06F 16/319 |

OTHER PUBLICATIONS

"A first at building an inverted index", (2009), 4 pgs.
"European Application No. 241811587.7 Extended European Search Report mailed Dec. 13, 2024", 8 pgs.
Jiang, Kun, et al., "Exhaustive Hybrid Posting Lists Traversing Technique", Springer International Publishing, (2015), 11 pgs.

* cited by examiner

*Primary Examiner* — Brittany N Allen
*Assistant Examiner* — William P Bartlett
(74) *Attorney, Agent, or Firm* — SCHWEGMAN LUNDBERG & WOESSNER, P.A.

(57) ABSTRACT

Example methods and systems are directed to inverted indexes. According to some examples, an inverted index is generated based on source data and a posting list threshold. The inverted index comprises one or more restricted posting lists. Each restricted posting list has a maximum size corresponding to the posting list threshold. The method may include receiving a search query comprising a value that identifies a restricted posting list of the one or more restricted posting lists. The value may be used to retrieve and return one or more record identifiers from the identified restricted posting list. A record identifier uniquely identifies one of the plurality of records in the source data.

20 Claims, 9 Drawing Sheets

ADJUSTABLE INVERTED INDEXES

TECHNICAL FIELD

The subject matter disclosed herein generally relates to data searching. More specifically, the subject matter relates to the generation of inverted indexes and to searching operations facilitated by inverted indexes.

BACKGROUND

In a traditional database, data can be arranged in a tabular format with each row representing a record, and each column representing an attribute. An inverted index is a data structure that maps unique values within the database to identifiers of the respective records (e.g., rows) in which those values appear. This data structure enables efficient tracking of instances of values within an underlying database or document set (referred to herein as the "source data"). In use, instead of performing a comprehensive scan of the source data to identify records containing a specific value (e.g., by inspecting each entry within a specific column) an inverted index can swiftly identify the records that contain the desired value. Thus, for certain access patterns, an inverted index can expedite the search process, saving computing cycles and processing power.

To be most useful, an inverted index is commonly stored in primary memory (such as random access memory). In addition to the memory already required to store the source data, an inverted index can consume a significant amount of primary memory. Further, synchronization and maintenance of an inverted index can be resource-intensive. As such, it is technically beneficial to reduce the resource requirements, and particularly the memory requirements, associated with an inverted index.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
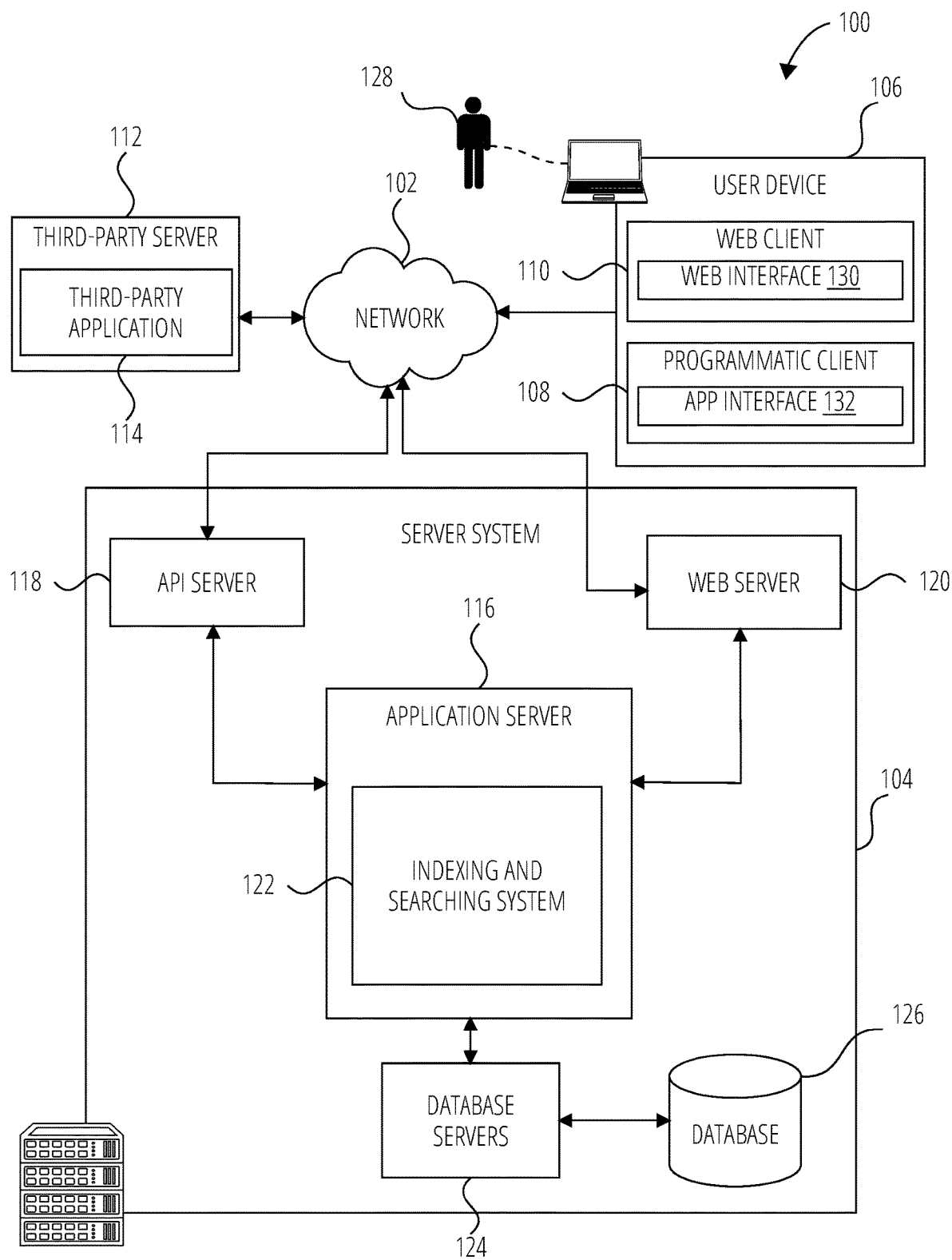
FIG. 1 is a diagrammatic representation of a network environment suitable for generating and adjusting inverted indexes, and for retrieving stored data, according to some examples.

Example methods and systems are directed to dynamically configurable or dynamically adjustable inverted indexes. The term "source data," as used in this disclosure, refers to the underlying data, or base data, used to generate an inverted index. Examples of source data include a table, a set of tables, a set of tokenized data, or a set of documents. In some cases, source data is preprocessed prior to generating the inverted index, as described further below.

Source data includes a plurality of records. The term "record," as used herein, refers to a single, uniquely identifiable entry in the source data, e.g., a row in a table that contains values for one or more of the table's columns. The term "record identifier" refers to any suitable identifier of a record, e.g., an identifier of a row.

An inverted index includes one or more posting lists. The term "posting list," as used in this disclosure, refers to a list or set of postings that identify where a particular value (also referred to as a "key" in the context of an inverted index) appears in the source data. Each posting may include a record identifier and, in some cases, a payload, such as a frequency indicator. The posting list thus serves as a reference back to the original records of the source data. Examples of the present disclosure enable the use of restricted posting lists within an inverted index to reduce the memory footprint of the inverted index, as described below.

According to some examples, a method includes accessing source data comprising a plurality of records. Prior to generating an inverted index, or before finalizing generation of the inverted index, a posting list threshold is identified. The posting list threshold defines a maximum size of one or more posting lists of the inverted index. The maximum size is, for example, the maximum number of postings that may be included in a particular posting list of an inverted index. The term "restricted posting list," as used in this disclosure, refers to a posting list that is restricted, limited, or capped, by a posting list threshold. For example, while a particular value might appear in ten different records within a set of source data, a restricted posting list may have a posting list threshold of five, resulting in only five of the ten records being identified by the restricted posting list within the generated inverted index.

The method may include generating an inverted index based on the source data and the posting list threshold. The inverted index generated in this manner then comprises one or more restricted posting lists. As mentioned, each restricted posting list has a maximum size corresponding to the posting list threshold. Accordingly, in some examples, a posting list may be truncated by implementing a posting list threshold to reduce memory requirements.

Posting list thresholds may be applied to one or multiple posting lists, and posting list thresholds can be applied globally (e.g., across the entire inverted index) or locally (e.g., per table or per attribute). In some examples, an inverted index may have a global posting list threshold that applies to all posting lists of the inverted index. In other examples, only a subset of posting lists may have a posting list threshold, or different posting lists within the same inverted index may have different posting list thresholds. In this way, an inverted index can be defined or configured in a flexible, customizable, or granular manner.

The generation of the inverted index may include, for each restricted posting list, populating the restricted posting list with postings (e.g., record identifiers from the source data) until the posting list threshold has been reached, or until all possible postings have been included, whichever occurs first.

In some examples, the method includes generating a flag (e.g., a Boolean indicator) that indicates whether the posting list threshold has been reached with respect to the restricted posting list. The flag may indicate, for example, that the posting list threshold has been reached and that the source data includes further record identifiers that have been omitted from the restricted posting list. In simple terms, the flag may thus indicate that "there is more" relevant data within the source data. The flag is stored in association with the corresponding restricted posting list.

In some examples, a posting list threshold may be adjusted before or after generation or initialization of the inverted index. For example, user input may be received to define, select, or adjust the posting list threshold. Adjustment of a posting list threshold may result in the relevant restricted posting list being dynamically updated.

A system according to some examples may be configured to adjust the posting list threshold automatically. For example, a system may analyze the source data and determine, based on patterns or attributes of the source data, a suitable posting list threshold. As another example, a system may monitor memory consumption associated with an inverted index and dynamically adjust the posting list threshold, e.g., adaptively reduce the posting list threshold to reduce the memory footprint of the inverted index. Automatic adjustments may be performed on different levels, e.g., global adjustments, per table adjustments, or per column adjustments.

Techniques described herein may further include receiving a search query and retrieving postings, e.g., record identifiers, from one or more posting lists of the inverted index responsive to receiving the search query. The search query may include a value that identifies a particular restricted posting list of the inverted index. For example, the search query may, fully or partially, match the key of the restricted posting list. The value in the search query may be used to retrieve and return one or more record identifiers from the identified restricted posting list.

As mentioned above, the inverted index may allow for swift lookups when compared to conventional table scans. However, a restricted posting list may, as a result of the posting list threshold, not identify all records that contain a certain value or key. A search operation may include detecting whether the posting list threshold has been reached with respect to the identified restricted posting list or detecting whether the source data includes record identifiers that have been omitted from the restricted posting list as a result of the posting list threshold. A fallback search may be performed to retrieve record identifiers omitted from the restricted posting list.

For example, the search operation may include checking the flag associated with the identified restricted posting list and identifying, based on the flag, that the source data includes relevant records that are not identified by the restricted posting list as a result of the limitation placed on the number of postings in the restricted posting list. In such cases, the flag may be regarded as a "fallback search flag." Alternatively, in response to detecting the flag, the source data may be checked to identify whether there are other relevant records to search.

The method may include performing a fallback search responsive to detecting a fallback search flag, responsive to detecting that the posting list threshold has been reached, responsive to detecting that there are other relevant records to search, or combinations thereof. The term "fallback search," as used in this disclosure, refers to a search or scan performed in the source data (as opposed to the inverted index) to retrieve one or more entries (e.g., record identifiers) that are not retrievable from a restricted posting list due to the abovementioned size cap.

Examples of the present disclosure thus enable a memory footprint of an inverted index to be reduced through an adjustable or customizable data structure. Since all information represented in an inverted index may also be represented in the associated source data, information omitted from an adjusted inverted index as a result of implementation of a posting list threshold remains retrievable via the source data. In this way, a system according to the invention may enable a user to achieve a desired balance between memory utilization and search performance. For example, in a particular implementation, it might be known that a majority of search queries can be handled by considering only the latest (most recent) 50% of records in a database. An inverted index can then be configured to populate its restricted posting lists with a predetermined number of postings from records in the source data in a reverse-chronological order, thus maximizing the probability that a search query can be handled by the inverted index, while reducing memory consumption. In some examples, when compared to the use of a conventional inverted index based on a set of source data, memory consumption may be significantly reduced by utilizing an inverted index with one or more suitable posting list thresholds in association with the same set of source data.

Examples of the present disclosure provide a useful tool that enables the balance between memory and retrieval performance to be controlled on a granular level. Adjusted inverted indexes, as described herein, may allow for reduced storage costs (e.g., by reducing primary memory consumption), smaller computing instances, or more dynamic scaling. As mentioned above, posting list thresholds may be automatically adjusted, which may improve efficiencies and reduce the level of manual input required to adjust or manage indexed data.

When the effects in this disclosure are considered in aggregate, one or more of the methodologies described herein may obviate a need for certain efforts or resources that otherwise would be involved in database or data retrieval systems. Computing resources utilized by systems, databases, or networks may be more efficiently utilized or reduced, e.g., as a result of an inverted index having a reduced memory footprint. Memory that is freed up in this manner can be utilized by other objects, applications, or resources. Alternatively or additionally, resultant idle memory can be put "to sleep," suspended, or powered down, allowing the memory to use less energy. Furthermore, by intelligently selecting or adjusting posting list thresholds, a reduction in memory requirements can be achieved without significantly hindering performance, retrieval time, or overall index usefulness.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 128. A web client 110 (e.g., a browser) or a programmatic client 108 (e.g., an "app") may be hosted and executed on the user device 106.

An Application Program Interface (API) server 118 and a web server 120 provide respective programmatic and web interfaces to components of the server system 104. A specific application server 116 hosts an indexing and searching system 122, which includes components, modules, or applications, that help users to create and dynamically adjust inverted indexes, and to perform search operations facilitated by such inverted indexes.

The user device 106 can communicate with the application server 116, e.g., via the web interface supported by the web server 120 or via the programmatic interface provided by the API server 118. It will be appreciated that, although only a single user device 106 is shown in FIG. 1, a plurality of user devices may be communicatively coupled to the server system 104 in some examples. Further, while certain functions may be described herein as being performed at either the user device 106 (e.g., web client 110 or programmatic client 108) or the server system 104, the location of certain functionality either within the user device 106 or the server system 104 may be a design choice.

The application server 116 is communicatively coupled to database servers 124, facilitating access to one or more information storage repository, e.g., a database 126. In some examples, the database 126 includes storage devices that store information to be processed or transmitted by the indexing and searching system 122, e.g., source data used to generate inverted indexes.

The application server 116 accesses application data (e.g., application data stored by the database servers 124) to provide one or more applications or tools to the user device 106 via a web interface 130 or an app interface 132. For example, and as described further below according to examples and with specific reference to FIGS. 2-7, the application server 116, using the indexing and searching system 122, may provide functionality enabling the user 128 to define, build, adjust and use various data structures, including inverted indexes.

To access the tools provided by the indexing and searching system 122, the user 128 may create an account with an entity associated with the server system 104, e.g., a service provider (or access an existing account with the entity). The user 128 may use account credentials to access the web interface 130 (via a suitable web browser) and request access to one or more of the tools. The user 128 may also, in some examples, access the tools using a dedicated programmatic client 108, in which case some functionality may be provided client-side and other functionality may be provided server-side.

In some examples, the application server 116 is part of a cloud-based platform provided by the entity associated with the server system 104 that allows an account holder to utilize the various tools of the indexing and searching system 122. For example, the account holder may create, manage, and use the retrieval functionality by accessing one or more cloud instances. The indexing and searching system 122 may provide user interfaces facilitating communication between the user 128 and the indexing and searching system 122, or between different users of the indexing and searching system 122.

In some examples, the application server 116 provides the user 128 with a set of features enabling the user 128 to set up, manage and scale a search solution, e.g., for a website or application. The service provided by the indexing and searching system 122 may provide a higher-level interface for creating and managing search solutions, including defining key parameters of inverted indexes, without requiring the user 128 to configure or handle lower-level details of the solutions, e.g., the actual indexing of data.

One or more of the application server 116, the database servers 124, the API server 118, the web server 120, and the indexing and searching system 122 may each be implemented in a computer system, in whole or in part, as described below with respect to FIG. 9. In some examples, third-party applications, such as a third-party application 114 executing on a third-party server 112, can communicate with the application server 116 via the programmatic interface provided by the API server 118. For example, a third-party application may support one or more features or functions on a website or platform hosted by a third party, or may perform certain methodologies and provide input or output information to the application server 116 for further processing or publication. The third-party server 112 may, for example, host source data to be used by the user 128 in creating a dynamically adjustable inverted index.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
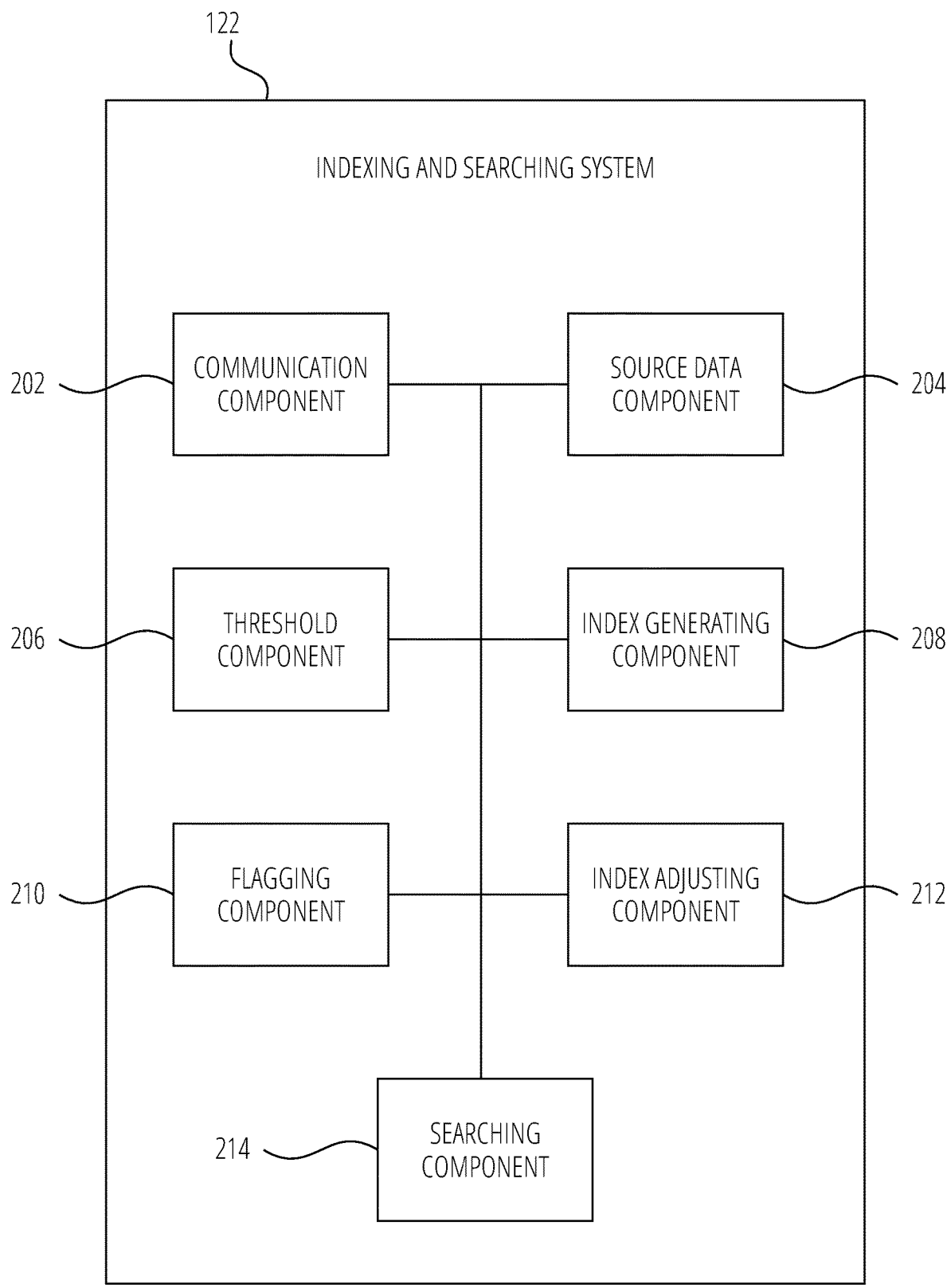
FIG. 2 is a block diagram of certain components of an indexing and searching system, according to some examples.

FIG. 2 is a block diagram illustrating certain components of the indexing and searching system 122, according to some examples. The indexing and searching system 122 is shown as including a communication component 202, a source data component 204, a threshold component 206, an index generating component 208, a flagging component 210, an index adjusting component 212, and a searching component 214.

In some examples, at least some of the components shown in FIG. 2 are configured to communicate with each other to implement aspects described herein. Any one or more of the components described herein may be implemented using hardware (e.g., one or more processors of one or more machines) or a combination of hardware and software. For example, any component described herein may be implemented by a processor configured to perform the operations described herein for that component. Moreover, any two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

The communication component 202 enables the user 128 of the user device 106 to transmit data to, and receive data from, the indexing and searching system 122. The communication component 202 may provide one or more user interfaces to enable the user 128 to utilize the tools of the indexing and searching system 122, e.g., to create or manage indexes, to create and manage search queries, or to perform information retrieval.

The source data component 204 is responsible for managing source data, e.g., one or more data tables used as the underlying data associated with one or more inverted indexes. The source data component 204 may communicate with a storage component, e.g., the database 126, to store and maintain the source data.

The threshold component 206 is configured to enable the use of restricted posting lists within an inverted index. As mentioned, the user 128 may, for example, provide user input to set or select one or more posting list thresholds for an inverted index. The threshold component 206 may, alternatively or additionally, perform automatic selection of one or more posting list thresholds.

The index generating component 208 is responsible for the creation of inverted indexes. The index generating component 208 may, for example, perform tokenization or other preprocessing operations (e.g., stop word elimination, special character removal, or case adjustments) to generate the required source data. To create an index, the index generating component 208 may, for each value (e.g., each unique attribute value or token) in the source data, create a posting list. Where a posting list is not associated with a posting list threshold, the posting list may be populated in a conventional manner, e.g., by adding a posting to identify each occurrence of the relevant value in the source data. Where a posting list is a restricted posting list (linked to a posting list threshold), the index generating component 208 may also populate the posting list with postings, with the proviso that the number of postings cannot exceed the posting list threshold. It is noted that various types of posting list thresholds can be implemented. In some cases, the posting list threshold may even be set to zero, which may be referred to as a "never store" setting, resulting in the index generating component 208 storing no entries relating to a particular value or key. Examples of different approaches to populating a restricted posting list are provided below.

The flagging component 210 is configured to generate and store a flag to indicate details of restrictions with respect to a particular inverted index. For example, the flagging component 210 may, for each restricted posting list, store a flag in the form of a Boolean value ("yes" or "no") that indicates whether the posting list threshold has been reached, e.g., to indicate whether the posting list has been "fully populated." The flag may be a bit or Boolean field that can be turned on or off to indicate a particular state. The flag may also indicate whether additional records that do not "fit" inside the restricted posting list are available or retrievable from the source data. The flag may be a fallback search flag that indicates that a fallback search is required to retrieve further data from the source data (in addition to the lookup search in the inverted index). As will be described in greater detail below, the use of one or more flags may facilitate retrieval of search results during a searching operation.

The flagging component 210 may be used to maintain flags, either automatically or through some degree of user input, as flags change over time. For example, an inverted index may initially not include any fallback search flags, but as further records are added to source data and the inverted index is updated, the flagging component 210 may add a fallback search flag. Flags can be maintained, for example, by performing "in-place" updates. This may involve directly modifying flags in the database without requiring the creation of copies of data. Another maintenance approach is, for example, "copy-and-switch" updating, which involves creating a new, updated copy and then switching the database to use the new copy once updates are complete. In some examples, the "in-place" technique may be performed faster, while the "copy-and-switch" technique may avoid potential data inconsistencies associated with in-place updates.

The inverted index, together with any associated flags, may be stored in various ways, depending on user requirements or use case. For example, the inverted index can be stored in primary memory, or written to disk. The inverted index may be stored in a format that allows for swift lookups, e.g., a simple array, a hash map, or a or B-tree.

The index adjusting component 212 is responsible for causing the adjustment of posting list thresholds, as well as resultant changes to inverted indexes. As mentioned, user input may be received (e.g., via the communication component 202) to adjust the posting list threshold, or the index adjusting component 212 may automatically adjust the posting list threshold to meet certain requirements, e.g., to optimize memory usage, optimize performance, or balance memory usage with performance. Adjustment of a posting list threshold may result in the relevant restricted posting list being dynamically updated. For example, if the posting list threshold for a specific restricted posting list is adjusted from five to ten, additional postings may automatically be added to the posting list threshold such that further record identifiers (referencing records in the source data) that did not previously form part of the restricted posting list, become part of the "expanded" restricted posting list.

The searching component 214 is configured to handle search queries. The searching component 214 is responsible for performing inverted index lookups and fallback searches in the source data. In some examples, due to the posting list threshold applied to an inverted index or a particular posting list of the inverted index, a full set of search results may not be retrievable by querying the inverted index only. In other words, relevant records matching a key of a restricted posting list are omitted from that restricted posting list due to the size cap. In such cases, and as described further below, the searching component 214 may perform a fallback search within the source data.

Figure 3:
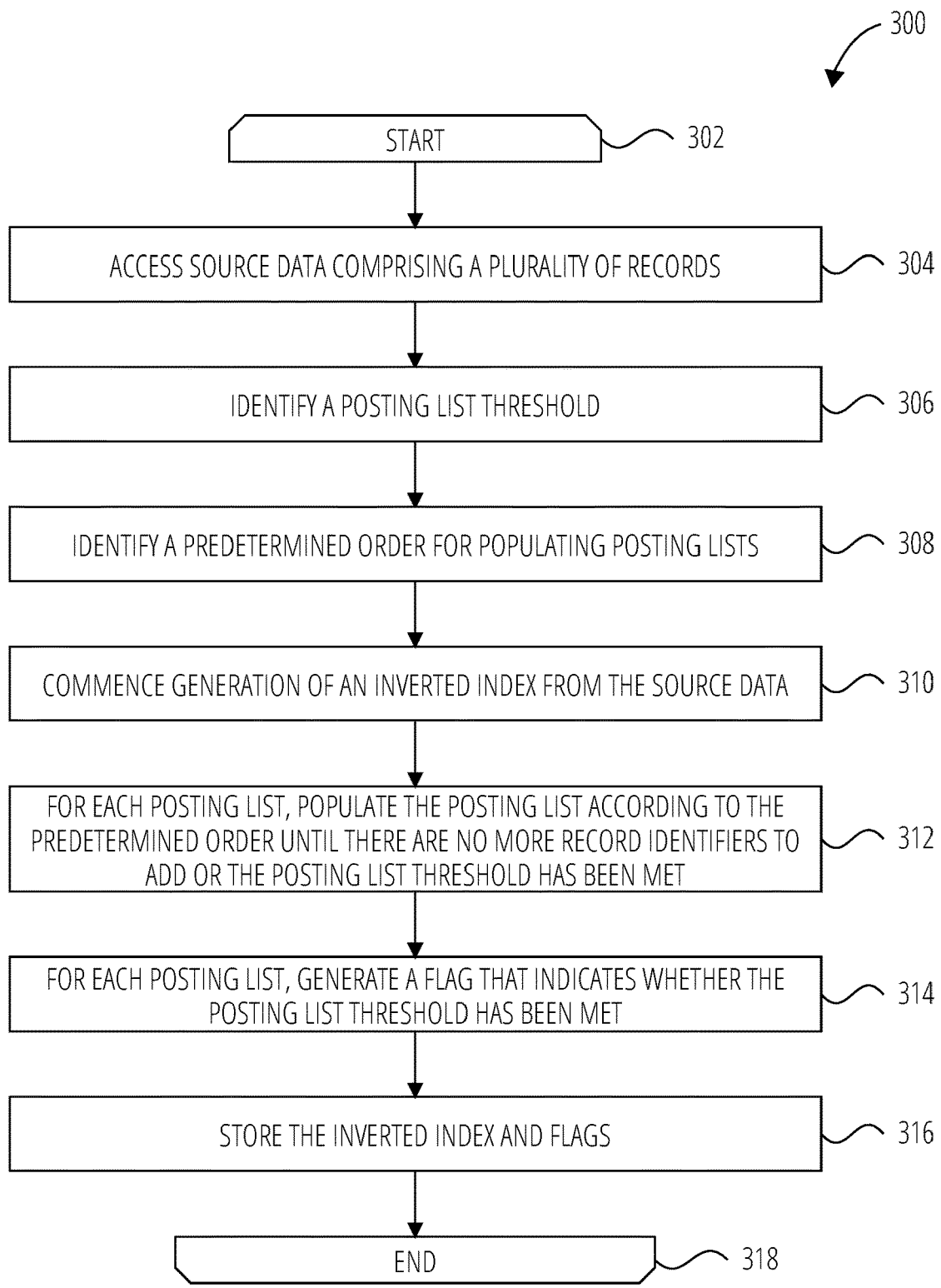
FIG. 3 is a flowchart illustrating operations of a method suitable for generating an inverted index with one or more restricted posting lists, according to some examples.

FIG. 3 is a flowchart illustrating operations of a method 300 suitable for generating an inverted index with one or more restricted posting lists, according to some examples. By way of example and not limitation, aspects of the method 300 may be performed by the components, devices, systems, or databases shown in FIG. 1 and FIG. 2. Furthermore, to illustrate certain aspects of the method 300, reference is made to exemplary data structures shown in FIGS. 4-6.

Figure 4:
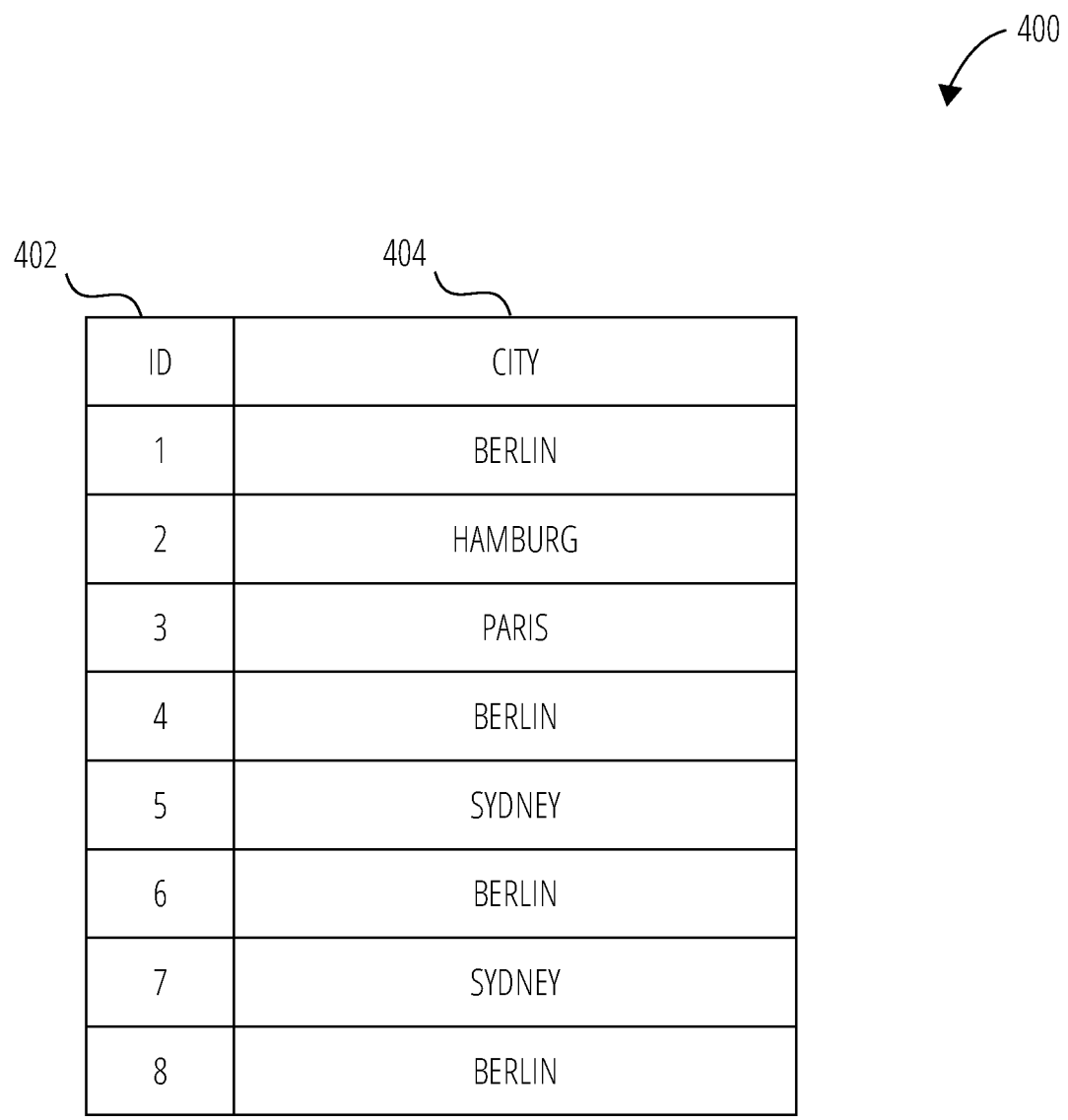
FIG. 4 illustrates source data represented in the form of a table, according to some examples.

The method 300 commences at opening loop element 302 and proceeds to operation 304 where the indexing and searching system 122 accesses source data comprising a plurality of records. FIG. 4 illustrates example source data in the form of a table 400. The table 400 comprises eight records, each represented by a row. The table 400 includes two columns which respectively define, for each row, a record identifier 402 (e.g., a row ID) and a value of an attribute 404. In FIG. 4, the attribute 404 is "City." In FIG. 4, the records are arranged chronologically. For example, row "8" represents the record that was most recently added to the source data.

It will be appreciated that the table 400 is shown to provide a simple example for purposes of illustrating certain aspects of the disclosure. Source data may be represented or stored in different formats or different structures and may, in other examples, include a large number of records, multiple attributes, multiple tables, and so forth.

The method 300 proceeds to operation 306, where a posting list threshold is identified at operation 306. As mentioned, depending on the implementation, the posting list threshold may be user-defined or may be automatically set by the indexing and searching system 122. The indexing and searching system 122 may analyze the records in the table 400 and determine a suitable posting list threshold based on the analysis, e.g., by considering certain requirements, such as reducing a memory footprint of an inverted index.

In some examples, the posting list threshold is a global posting list threshold that is applied to each posting list of the inverted index that is to be generated from the table 400, e.g., each posting list will be a restricted posting list. In other examples, the posting list threshold may be an attribute-specific posting list threshold, e.g., a threshold that is only applied to posting lists for values of a specific attribute in the source data. In such cases, the restricted posting lists in the inverted index may be a subset of a total number of posting lists, as some posting lists may have no posting list threshold. For example, the user 128 may attach greater importance to a first column of a table than to a second column of a table, and may thus wish to generate a full "conventional" inverted index for the values in the first column, while wanting to reduce overall memory by generating a truncated index for values in the second column.

As another example, the user 128 may attach greater importance to a specific table in a case where the source data includes multiple tables. In such a case, the posting list threshold may be table-specific posting list threshold that is applied only to values that appear in the specific table.

The posting list threshold may thus define the maximum size associated with one or more posting lists. In the examples described below, the posting list threshold is a global posting list threshold that applies across the entire inverted index. Referring to the table 400, the posting list threshold may, for example, be set as "five" or as "two." These two examples are described further below, with reference to FIG. 5 and FIG. 6, respectively.

Turning again to FIG. 3, the method 300 proceeds to operation 308, where the indexing and searching system 122 identifies a predetermined order for populating the posting lists of the inverted index. For example, the predetermined order may be a reverse-chronological order in which the latest (most recently added) records of the table 400 are added to the inverted index first. The reverse-chronological order is used as an example order to describe FIG. 5 and FIG. 6 below. Alternatively, the predetermined order may be a chronological order. It will be appreciated that different orders or populating rules may be applied, depending on the specific use case.

At operation 310, the indexing and searching system 122 commences generation of the inverted index from the source data in the table 400. The inverted index is populated based on the predetermined order (operation 312). A posting list is generated to represent each unique value in the table 400 ("Berlin," "Hamburg," "Paris," and "Sydney"). Record identifiers are added to each posting list until all possible record identifiers have been added, or until the posting list threshold is reached.

Figure 5:
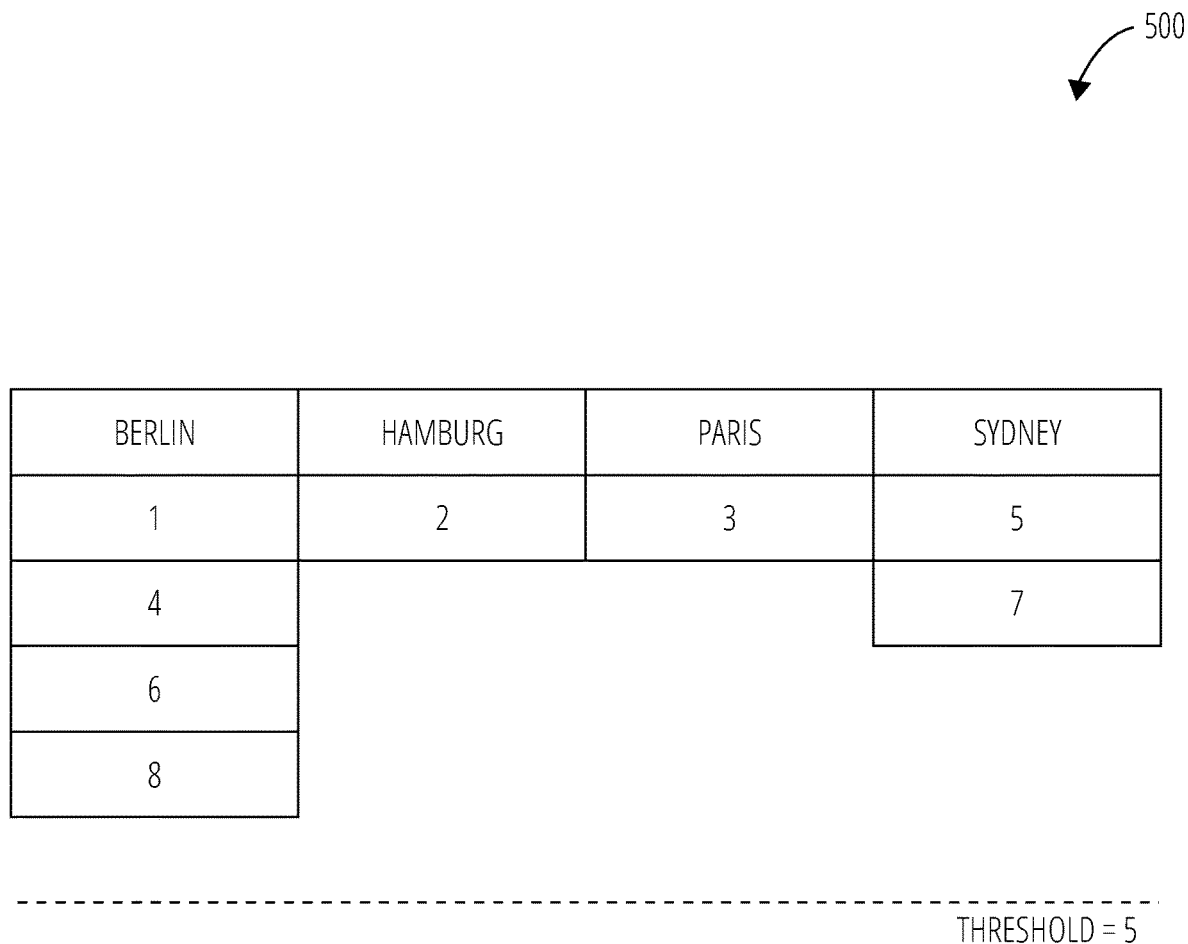
FIG. 5 illustrates an inverted index and further conceptually illustrates a posting list threshold, according to some examples.

Referring to FIG. 5, a first example of an inverted index 500 is shown. The inverted index 500 is generated based on the table 400, using a posting list threshold of five. As all of the values occur less than five times in the source data, the posting list threshold is not reached for any of the posting lists, and the inverted index 500 resembles a conventional inverted index. In other words, the posting list threshold does not result in any memory savings compared to a standard inverted index, while retrieval performance will also mirror a standard inverted index.

Figure 6:
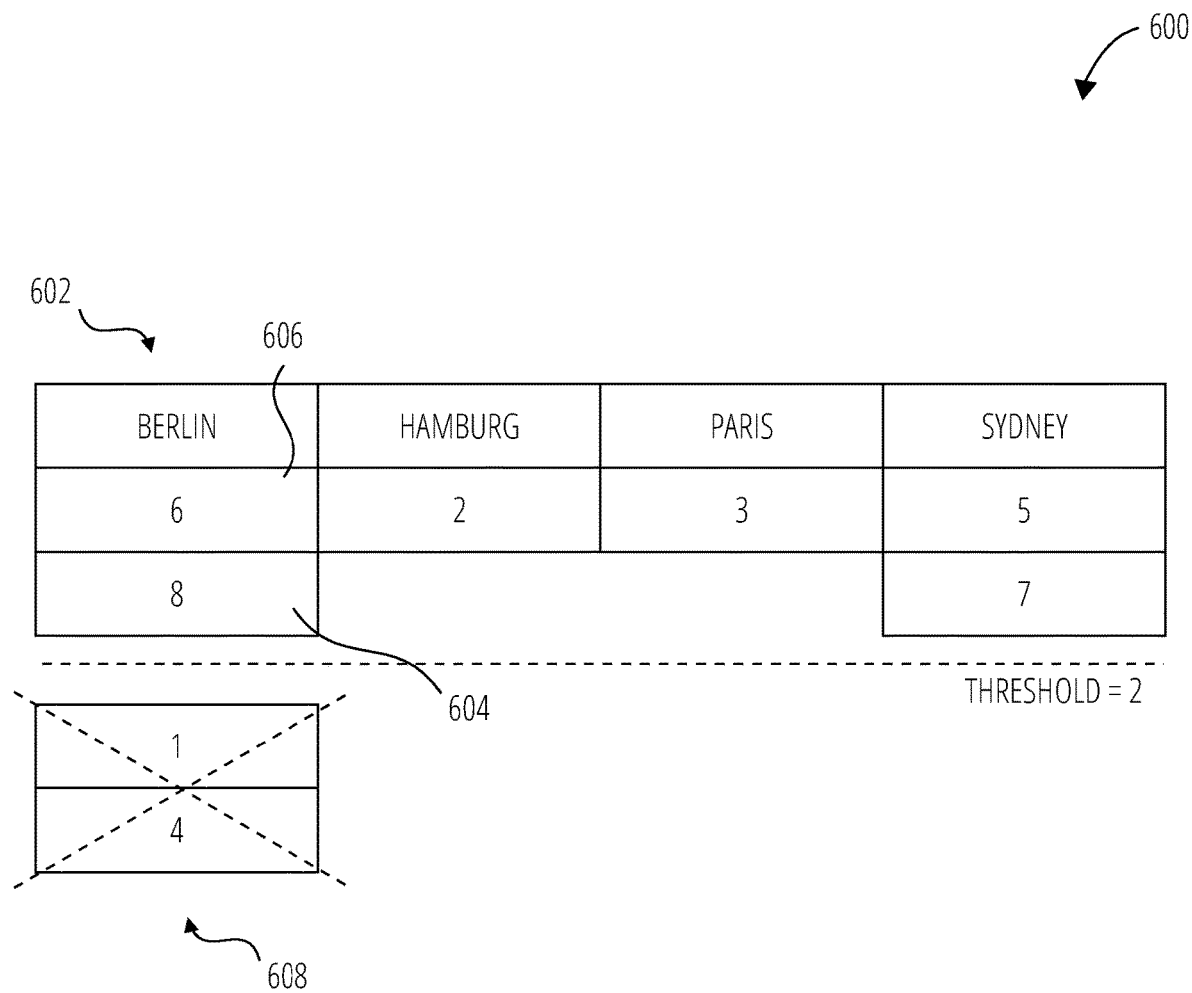
FIG. 6 illustrates an inverted index and further conceptually illustrates a posting list threshold and record identifiers omitted from the inverted index based on the posting list threshold, according to some examples.

Referring now to FIG. 6, a second example of an inverted index 600 is shown. The inverted index 600 is also generated based on the table 400, but using a posting list threshold of two. The values "Hamburg," "Paris," and "Sydney" do not occur more than twice in the table 400, and thus all of the relevant record identifiers are included in the inverted index. For the value "Sydney," the posting list reaches its posting list threshold, but no record identifiers of records containing "Sydney" are omitted from the inverted index 600.

On the other hand, for the value "Berlin" in the inverted index 600, the value occurs in four different records in the table 400, and thus record identifiers for only two of the records can be included in the posting list 602, as shown in FIG. 6. As mentioned above, a reverse-chronological order is used to populate the posting list 602, and a first record identifier 604, "8," is added first, because the corresponding record was added to the table 400 most recently. Continuing with the reverse-chronological order, a second record identifier 606, "6," is added to the posting list 602. This causes the posting list threshold to be reached and no further postings can be added to the posting list 602. As a result, two record identifiers, "1" and "4," are excluded. The excluded record identifiers 608 are conceptually illustrated in FIG. 6.

In the case of FIG. 6, therefore, the inverted index 600 differs from a conventional inverted index in that the posting list 602 is truncated. This reduces the memory footprint of the inverted index 600, e.g., compared to the inverted index 500 of FIG. 5.

As explained above, the inverted index 600 has a global posting list threshold, which means that all of its posting lists are restricted posting lists. However, this does not mean that all posting lists have necessarily reached the global posting list threshold. At operation 314, the method 300 includes generating a flag for each posting list. For example, the indexing and searching system 122 may apply a Boolean value flag that indicates, with respect to each posting list, whether the posting list threshold has been met. In such a case, the flag for "Berlin" and "Sydney" would be "Yes" in the case of FIG. 6 (while the flags for "Hamburg" and "Paris" would be "No"). Alternatively, the flag may only indicate "Yes" if the posting list threshold has been met and there are omitted record identifiers associated with the value in question. In such a case, the flag may be referred to as a fallback search flag, and in FIG. 6, only the flag for "Berlin" would be "Yes," while all other flags would be "No." In other words, for a query relating to the value/key "Berlin," the fallback search flag provides a quick indicator that the source data must be searched to locate the excluded record identifiers 608.

The method 300 of FIG. 3 proceeds to block 316, where the inverted index is stored. For example, the inverted index 600 and the flag (or flags) may be stored in primary memory, together with a pointer to the original source data, e.g., the table 400 of FIG. 4, which may be stored in secondary memory. Reducing the memory footprint of an inverted index through the application of one or more posting list threshold may thus result in more efficient primary memory usage. The method 300 ends at closing loop element 318.

Referring again to FIG. 6, the inverted index 600 may be updated as the source data is updated, in use. For example, new rows "9" and "10" may be added to the table 400, both having the value "Berlin" in the "City" column. This would result in the records "6" and "8" automatically being replaced with "9" and "10" in the posting list 602 by the indexing and searching system 122, according to the prevailing reverse-chronological order. Similarly, if another row, "11," with a value "Sydney," is added to the table 400, it would cause the record "5" to be removed from the "Sydney" posting list by the indexing and searching system 122 and automatically be replaced with the record "11." In some examples, the inverted index may thus be dynamically updated to reflect changes in the source data, e.g., to include the records that were most recently added to the source data within the inverted index.

Still referring to FIG. 6, the inverted index 600 may be adjusted by dynamically changing the posting list threshold. For example, to reduce memory consumption, the posting list threshold may be changed from "two" to "one," thus causing the posting lists for "Berlin" and "Sydney" both to "lose" one posting.

Alternatively, to improve search performance, the posting list threshold may be changed to "three," causing an additional posting to be added to the posting list 602. The maximum size of each restricted posting list may thus be adjusted to correspond to an adjusted posting list threshold. The balance, or trade-off, between memory requirements and performance requirements, may be dynamically selected or adjusted, either manually by the user 128 or automatically by the indexing and searching system 122, as described above.

It will be appreciated that data may be stored in various formats or structures. For example, posting lists may be stored as arrays, in which case a copy operation may be required to remove an entry (e.g., the "oldest" entry). Other formats may include linked lists, ring buffers, and other related formats. Similarly, various techniques may be used to make changes to an inverted index. For example, the inverted index may be locked by the indexing and searching system 122 such that the relevant columns (posting lists) can be updated, e.g., by adding more entries as required.

Figure 7:
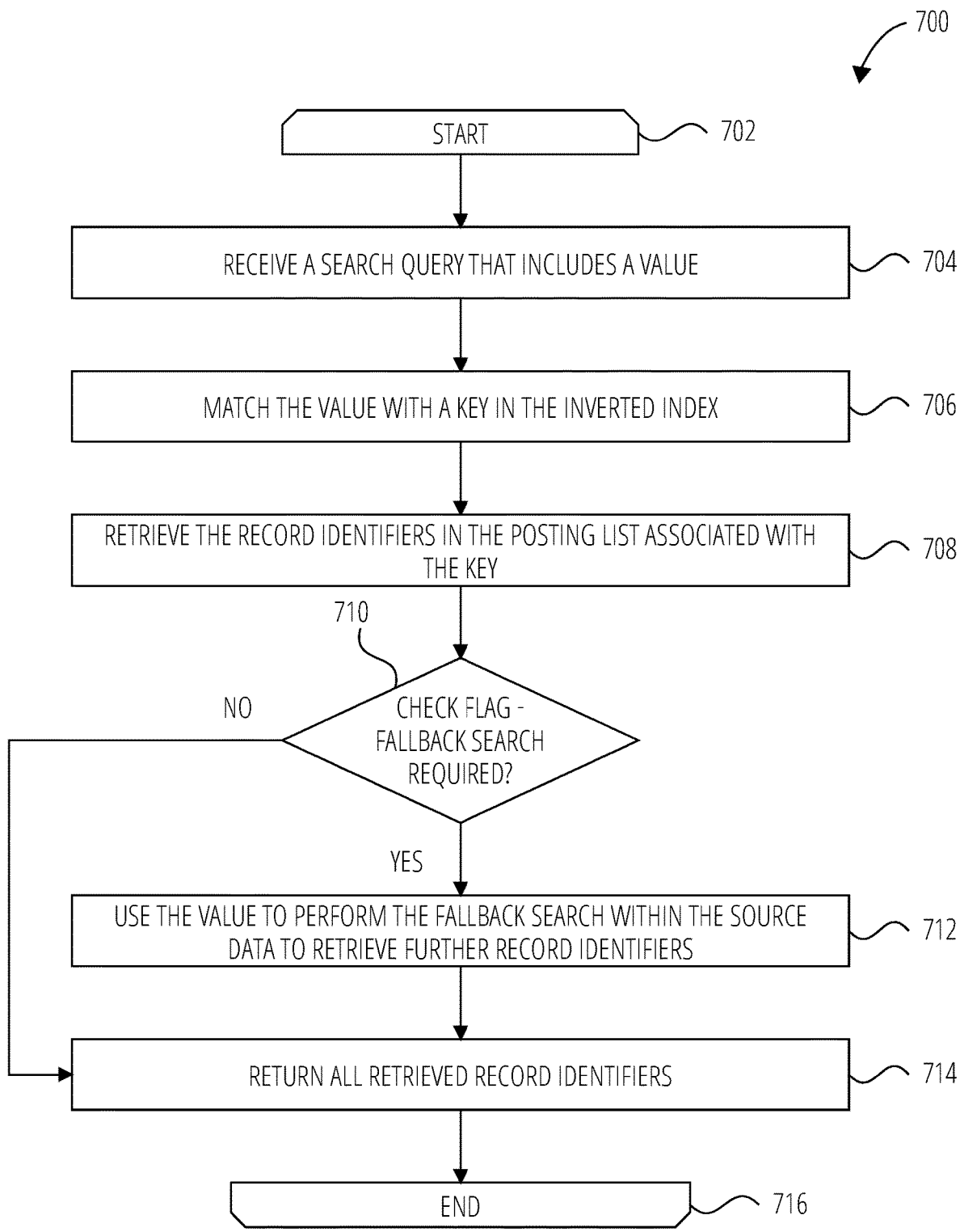
FIG. 7 is a flowchart illustrating operations of a method suitable for retrieving data using an inverted index, according to some examples.

FIG. 7 is a flowchart illustrating operations of a method 700 suitable for retrieving data using an inverted index, according to some examples. By way of example and not limitation, aspects of the method 700 may be performed by the components, devices, systems, or databases shown in FIG. 1 and FIG. 2. The table 400 of FIG. 4 and the inverted index 600 of FIG. 6 are referred to below together with the operations of FIG. 7 to illustrate certain aspects of the method 700.

The method 700 commences at opening loop element 702, and proceeds to operation 704, where the indexing and searching system 122 receives a search query that includes a value. For example, in the case of the inverted index 600 of FIG. 6, the search query may include the value "Berlin" or the value "Hamburg."

At operation 706, the indexing and searching system 122 matches the value with a key in the inverted index 600. For example, where the value is "Berlin," the indexing and searching system 122 matches the search query with the relevant key and the posting list 602. The method 700 then proceeds to operation 708, where the indexing and searching system 122 retrieves the postings (e.g., record identifiers) from the relevant posting list. For example, the indexing and searching system 122 retrieves the first record identifier 604 and the second record identifier 606 from the posting list 602 in response to the "Berlin" query.

The indexing and searching system 122 checks the flag associated with the relevant posting list to determine whether a fallback search is required (decision operation 710). For example, if the search query is for "Berlin," the inverted index 600 has a fallback search flag which essentially indicates that "there is more to be found" within the source data. In that case, the method 700 proceeds to operation 712, where the indexing and searching system 122 searches the table 400 to identify the excluded record identifiers 608, thereby obtaining a full set of search results. On the other hand, if the search query is for "Hamburg," based on the flag, the indexing and searching system 122 determines that no fallback search is required (because the posting list in the inverted index 600 already provides a full set of search results).

A fallback search may thus be performed in cases where the restricted, or truncated, inverted index cannot fully "answer" the request. In some examples, a fallback search may be optimized by the indexing and searching system 122 by analyzing the contents of the relevant posting list to narrow down the scope of the fallback search. Specifically, the indexing and searching system 122 may identify only a range or subset of the records in the source data that is not covered by the posting list, and search only that range or subset of the records, instead of performing a full scan of the source data.

As an example, in the case of "Berlin," the indexing and searching system 122 detects that the posting list 602 includes the record identifiers "6" and "8," and based on this detection, determines that it only needs to scan records "1" through "5" to search for the value "Berlin" in the source data (e.g., the table 400). In this way, entries that are already handled or covered within the inverted index can be skipped, thus improving the efficiency of the searching operation, and reducing the processing resources required for the fallback search.

At operation 714, the indexing and searching system 122 then returns the retrieved record identifiers. For example, in the case of the query for "Berlin," the indexing and searching system 122 may return the combined result of the inverted index lookup (which returns "6" and "8") and the fallback search (which returns the missing records, "1" and "4"). The method 700 concludes at closing loop element 716.

It will be appreciated that inverted indexes that are generated using techniques described herein may be used to handle more complex queries than the single-value queries referred to in the above examples. For example, if the search query includes two values, each associated with a different posting list, the indexing and searching system 122 may intersect the posting lists to find all records in which both values appear (if any). In some examples, a combination of an inverted index lookup and a fallback search may be used for this purpose.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: generating, based on source data and a posting list threshold, an inverted index that comprises one or more restricted posting lists, each restricted posting list having a maximum size corresponding to the posting list threshold, and the source data comprising a plurality of records; receiving a search query comprising a value that identifies a restricted posting list of the one or more restricted posting lists; responsive to receiving the search query, using the value to retrieve one or more record identifiers from the identified restricted posting list, each record identifier uniquely identifying a record from among the plurality of records; and returning the one or more record identifiers.

In Example 2, the subject matter of Example 1 includes, wherein generating the inverted index comprises, for each restricted posting list: populating the restricted posting list with at least one record identifier; generating a flag indicative of whether the posting list threshold has been reached with respect to the restricted posting list; and storing the flag in association with the restricted posting list.

In Example 3, the subject matter of Example 2 includes, responsive to receiving the search query: detecting, at least partially based on the flag, that a fallback search is required; and responsive to detecting that the fallback search is required, using the value to perform the fallback search to retrieve, from the source data, at least one record identifier that is not retrievable from the identified restricted posting list.

In Example 4, the subject matter of Example 3 includes, wherein performing the fallback search comprises: identifying a range or subset of the records in the source data that is not covered by the identified restricted posting list; and searching the range or subset of the records to identify records that include the value.

In Example 5, the subject matter of Examples 1-4 includes, wherein generating the inverted index comprises populating each restricted posting list with record identifiers of records in the source data until the posting list threshold is reached.

In Example 6, the subject matter of Example 5 includes, wherein each restricted posting list is populated based on a predetermined order.

In Example 7, the subject matter of Example 6 includes, wherein the predetermined order is a reverse-chronological order.

In Example 8, the subject matter of Examples 1-7 includes, wherein the inverted index comprises a plurality of posting lists, and wherein the posting list threshold is a global posting list threshold that is applied to each posting list of the inverted index such that each posting list is a restricted posting list.

In Example 9, the subject matter of Examples 1-8 includes, wherein the inverted index comprises a plurality of posting lists, wherein the source data comprises values for a plurality of attributes, and wherein the posting list threshold is an attribute-specific posting list threshold that is applied to the one or more restricted posting lists, the one or more restricted posting lists being a subset of the plurality of posting lists.

In Example 10, the subject matter of Examples 1-9 includes, wherein the inverted index comprises a plurality of posting lists, wherein the source data comprises a plurality of tables, and wherein the posting list threshold is a table-specific posting list threshold that is applied to the one or more restricted posting lists, the one or more restricted posting lists being a subset of the plurality of posting lists.

In Example 11, the subject matter of Examples 1-10 includes, receiving user input to select the posting list threshold.

In Example 12, the subject matter of Examples 1-11 includes: analyzing the records in the source data; and selecting, based on analyzing the records in source data, the posting list threshold.

In Example 13, the subject matter of Examples 1-12 includes, subsequent to generating the inverted index: receiving user input to adjust the posting list threshold; and responsive to receiving the user input to adjust the posting list threshold: defining an adjusted posting list threshold, and adjusting the maximum size of each restricted posting list to correspond to the adjusted posting list threshold.

In Example 14, the subject matter of Examples 1-13 includes, wherein the source data comprises at least one table, wherein the records are represented as respective rows in the at least one table, each table further including at least one column that each represents an attribute, wherein unique values of the attribute are used as respective keys in the inverted index.

Example 15 is a method comprising: generating, based on source data and a posting list threshold, an inverted index that comprises one or more restricted posting lists, each restricted posting list having a maximum size corresponding to the posting list threshold, and the source data comprising a plurality of records; receiving a search query comprising a value that identifies a restricted posting list of the one or more restricted posting lists; responsive to receiving the search query, using the value to retrieve one or more record identifiers from the identified restricted posting list, each record identifier uniquely identifying a record from among the plurality of records; and returning the one or more record identifiers.

In Example 16, the subject matter of Example 15 includes, wherein generating the inverted index comprises, for each restricted posting list: populating the restricted posting list with at least one record identifier; generating a flag indicative of whether the posting list threshold has been reached with respect to the restricted posting list; and storing the flag in association with the restricted posting list.

In Example 17, the subject matter of Example 16 includes, responsive to receiving the search query: detecting, at least partially based on the flag, that a fallback search is required; and responsive to detecting that the fallback search is required, using the value to perform the fallback search to retrieve, from the source data, at least one record identifier that is not retrievable from the identified restricted posting list.

Example 18 is a non-transitory computer-readable medium that stores instructions that, when executed by one or more processors, cause the one or more processors to perform operations comprising: generating, based on source data and a posting list threshold, an inverted index that comprises one or more restricted posting lists, each restricted posting list having a maximum size corresponding to the posting list threshold, and the source data comprising a plurality of records; receiving a search query comprising a value that identifies a restricted posting list of the one or more restricted posting lists; responsive to receiving the search query, using the value to retrieve one or more record identifiers from the identified restricted posting list, each record identifier uniquely identifying a record from among the plurality of records; and returning the one or more record identifiers.

In Example 19, the subject matter of Example 18 includes, wherein generating the inverted index comprises, for each restricted posting list: populating the restricted posting list with at least one record identifier; generating a flag indicative of whether the posting list threshold has been reached with respect to the restricted posting list; and storing the flag in association with the restricted posting list.

In Example 20, the subject matter of Example 19 includes, responsive to receiving the search query: detecting, at least partially based on the flag, that a fallback search is required; and responsive to detecting that the fallback search is required, using the value to perform the fallback search to retrieve, from the source data, at least one record identifier that is not retrievable from the identified restricted posting list.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 8:
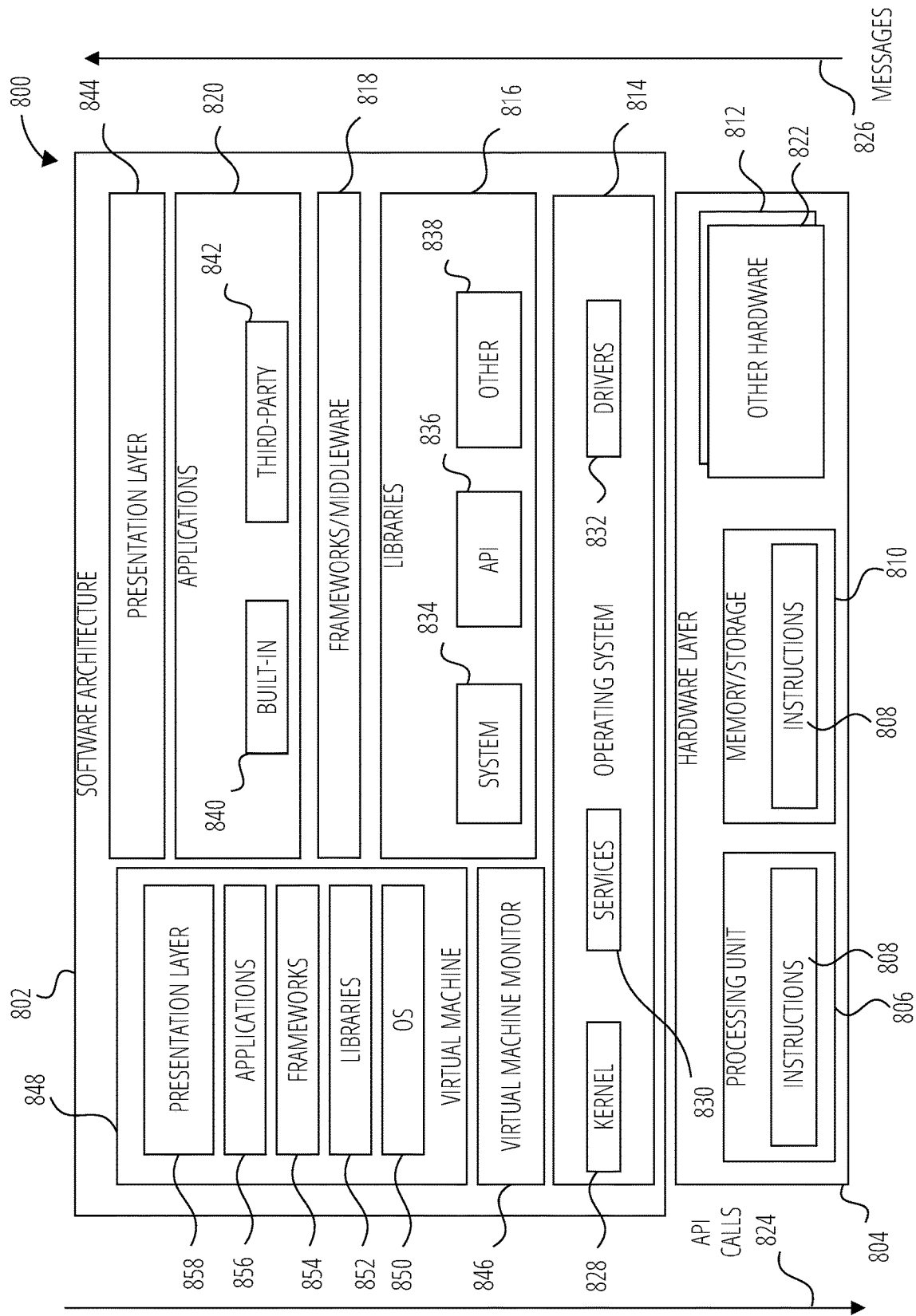
FIG. 8 is a block diagram showing a software architecture for a computing device, according to some examples.

FIG. 8 is a block diagram 800 showing a software architecture 802 for a computing device, according to some examples. The software architecture 802 may be used in conjunction with various hardware architectures, for example, as described herein. FIG. 8 is merely a non-limiting illustration of a software architecture, and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 and other hardware 822 which represent any other hardware of the hardware layer 804, such as the other hardware illustrated as part of the software architecture 802.

In the architecture of FIG. 8, the software architecture 802 may be conceptualized as a stack of layers where each layer provides particular functionality. For example, the software architecture 802 may include layers such as an operating system 814, libraries 816, frameworks/middleware layer 818, applications 820, and presentation layer 844. Operationally, the applications 820 or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the software architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 816 may provide a common infrastructure that may be utilized by the applications 820 or other components or layers. The libraries 816 typically provide functionality that allows other software modules to perform tasks in an easier fashion than to interface directly with the underlying operating system 814 functionality (e.g., kernel 828, services 830 or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware layer 818 may provide a higher-level common infrastructure that may be utilized by the applications 820 or other software components/modules. For example, the frameworks/middleware layer 818 may provide various graphic user interface (GUI) functions, high-level resource management, high-level location services, and so forth. The frameworks/middleware layer 818 may provide a broad spectrum of other APIs that may be utilized by the applications 820 or other software components/modules, some of which may be specific to a particular operating system or platform.

The applications 820 include built-in applications 840 or third-party applications 842. Examples of representative built-in applications 840 may include, but are not limited to, a contacts application, a browser application, a book reader application, a location application, a media application, a messaging application, or a game application. Third-party applications 842 may include any of the built-in applications as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built in operating system functions (e.g., kernel 828, services 830 or drivers 832), libraries (e.g., system libraries 834, API libraries 836, and other libraries 838), and frameworks/middleware layer 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (e.g., operating system 814). A software architecture executes within the virtual machine 848 such as an operating system 850, libraries 852, frameworks/middleware 854, applications 856 or presentation layer 858. These layers of software architecture executing within the virtual machine 848 can be the same as corresponding layers previously described or may be different.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module that operates to perform certain operations as described herein.

In various examples, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules are temporarily configured (e.g., programmed), each of the hardware-implemented modules need not be configured or instantiated at any one instance in time. For example, where the hardware-implemented modules comprise, a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (Saas)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 9:
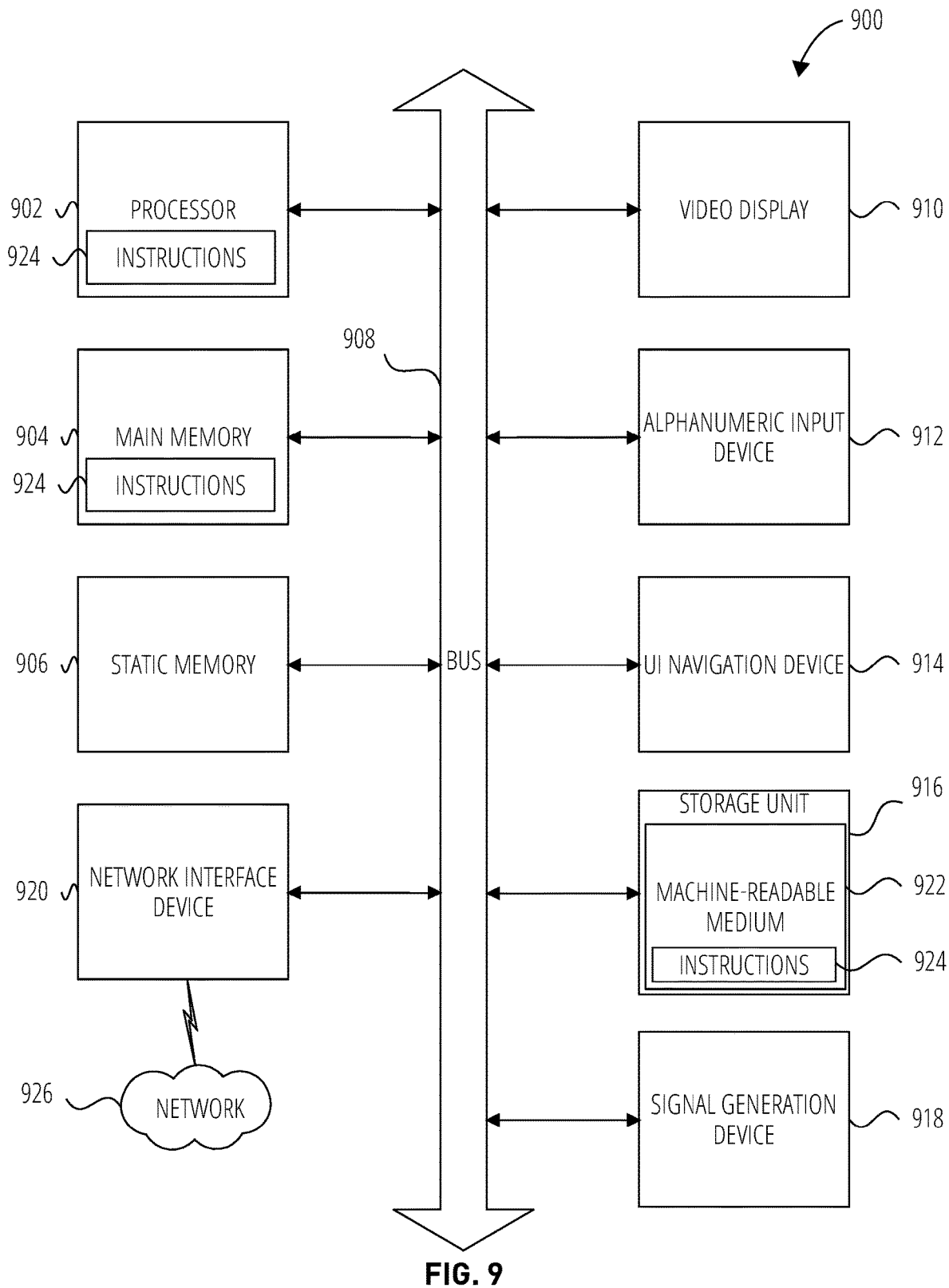
FIG. 9 is a block diagram of a machine in the form of a computer system, according to some examples, within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a GPU, or both), a primary or main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a UI navigation (or cursor control) device 914 (e.g., a mouse), a storage unit 916, a signal generation device 918 (e.g., a speaker), and a network interface device 920.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 or within the processor 902 during execution thereof by the computer system 900, with the main memory 904 and the processor 902 also each constituting a machine-readable medium 922.

While the machine-readable medium 922 is shown in accordance with some examples to be a single medium, the term "machine-readable medium" may include a single medium or multiple media (e.g., a centralized or distributed database, or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of a machine-readable medium 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 924 may further be transmitted or received over a communications network 926 using a transmission medium. The instructions 924 may be transmitted using the network interface device 920 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 924 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

What is claimed is:

1. A system comprising:
at least one memory that stores instructions; and
one or more processors configured by the instructions to perform operations comprising:
storing, based on source data and a posting list threshold, an inverted index that comprises one or more restricted posting lists, each restricted posting list having a maximum size corresponding to the posting list threshold, and the source data comprising a plurality of records, wherein generating of the inverted index comprises, for each restricted posting list:
populating the restricted posting list with at least one record identifier, each record identifier uniquely identifying a record from among the plurality of records;
generating a flag indicative of whether the posting list threshold has been reached with respect to the restricted posting list; and
storing the flag in association with the restricted posting list;
receiving a search query comprising a value that identifies a restricted posting list of the one or more restricted posting lists of the stored inverted index;
responsive to receiving the search query, accessing the stored inverted index to retrieve, based on the value, one or more record identifiers from the identified restricted posting list; and
returning the one or more record identifiers.

2. The system of claim 1, the operations further comprising, responsive to receiving the search query:
detecting, at least partially based on the flag, that a fallback search is required; and
responsive to detecting that the fallback search is required, accessing the source data to perform the fallback search to retrieve, based on the value, at least one record identifier that is not retrievable from the identified restricted posting list.

3. The system of claim 2, wherein the performing of the fallback search comprises:
identifying a range or a subset of the records in the source data that is not covered by the identified restricted posting list; and
searching the range or the subset of the records to identify records that include the value.

4. The system of claim 1, wherein the generating of the inverted index comprises populating each restricted posting list with record identifiers of records in the source data until the posting list threshold is reached.

5. The system of claim 4, wherein each restricted posting list is populated based on a predetermined order.

6. The system of claim 5, wherein the predetermined order is a reverse-chronological order.

7. The system of claim 1, wherein the inverted index comprises a plurality of posting lists, and wherein the posting list threshold is a global posting list threshold that is applied to each posting list of the inverted index such that each posting list is a restricted posting list.

8. The system of claim 1, wherein the inverted index comprises a plurality of posting lists, wherein the source data comprises values for a plurality of attributes, and wherein the posting list threshold is an attribute-specific posting list threshold that is applied to the one or more restricted posting lists, the one or more restricted posting lists being a subset of the plurality of posting lists.

9. The system of claim 1, wherein the inverted index comprises a plurality of posting lists, wherein the source data comprises a plurality of tables, and wherein the posting list threshold is a table-specific posting list threshold that is applied to the one or more restricted posting lists, the one or more restricted posting lists being a subset of the plurality of posting lists.

10. The system of claim 1, the operations further comprising:
receiving user input to select the posting list threshold.

11. The system of claim 1, the operations further comprising:
analyzing the records in the source data; and
selecting, based on analyzing the records in the source data, the posting list threshold.

12. The system of claim 1, the operations further comprising, subsequent to generating the inverted index:
receiving user input to adjust the posting list threshold; and
responsive to receiving the user input to adjust the posting list threshold:
defining an adjusted posting list threshold, and
adjusting the maximum size of each restricted posting list to correspond to the adjusted posting list threshold.

13. The system of claim 1, wherein the source data comprises at least one table, wherein the records are represented as respective rows in the at least one table, each table further including at least one column that each represents an attribute, wherein unique values of the attribute are used as respective keys in the inverted index.

14. A method comprising:
storing, based on source data and a posting list threshold, an inverted index that comprises one or more restricted posting lists, each restricted posting list having a maximum size corresponding to the posting list threshold, and the source data comprising a plurality of records, wherein generating of the inverted index comprises, for each restricted posting list:
populating the restricted posting list with at least one record identifier, each record identifier uniquely identifying a record from among the plurality of records;
generating a flag indicative of whether the posting list threshold has been reached with respect to the restricted posting list; and
storing the flag in association with the restricted posting list;
receiving a search query comprising a value that identifies a restricted posting list of the one or more restricted posting lists of the stored inverted index;
responsive to receiving the search query, accessing the stored inverted index to retrieve, based on the value, one or more record identifiers from the identified restricted posting list; and
returning the one or more record identifiers.

15. The method of claim 14, further comprising, responsive to receiving the search query:
detecting, at least partially based on the flag, that a fallback search is required; and
responsive to detecting that the fallback search is required, accessing the source data to perform the fallback search to retrieve, based on the value, at least one record identifier that is not retrievable from the identified restricted posting list.

16. A non-transitory computer-readable medium that stores instructions that, when executed by one or more processors, cause the one or more processors to perform operations comprising:
storing, based on source data and a posting list threshold, an inverted index that comprises one or more restricted posting lists, each restricted posting list having a maximum size corresponding to the posting list threshold, and the source data comprising a plurality of records, wherein generating of the inverted index comprises, for each restricted posting list:
populating the restricted posting list with at least one record identifier, each record identifier uniquely identifying a record from among the plurality of records;
generating a flag indicative of whether the posting list threshold has been reached with respect to the restricted posting list; and
storing the flag in association with the restricted posting list;
receiving a search query comprising a value that identifies a restricted posting list of the one or more restricted posting lists of the stored inverted index;
responsive to receiving the search query, accessing the stored inverted index to retrieve, based on the value, one or more record identifiers from the identified restricted posting list; and
returning the one or more record identifiers.

17. The non-transitory computer-readable medium of claim 16, the operations further comprising, responsive to receiving the search query:
detecting, at least partially based on the flag, that a fallback search is required; and
responsive to detecting that the fallback search is required, accessing the source data to perform the fallback search to retrieve, based on the value, at least one record identifier that is not retrievable from the identified restricted posting list.

18. The system of claim 1, wherein the accessing of the stored inverted index comprises accessing the stored inverted index from primary memory, the source data being stored in secondary memory.

19. The method of claim 14, wherein the accessing of the stored inverted index comprises accessing the stored inverted index from primary memory, the source data being stored in secondary memory.

20. The non-transitory computer-readable medium of claim 16, wherein the accessing of the stored inverted index comprises accessing the stored inverted index from primary memory, the source data being stored in secondary memory.

* * * * *